United States Patent Office 3,754,080
Patented Aug. 21, 1973

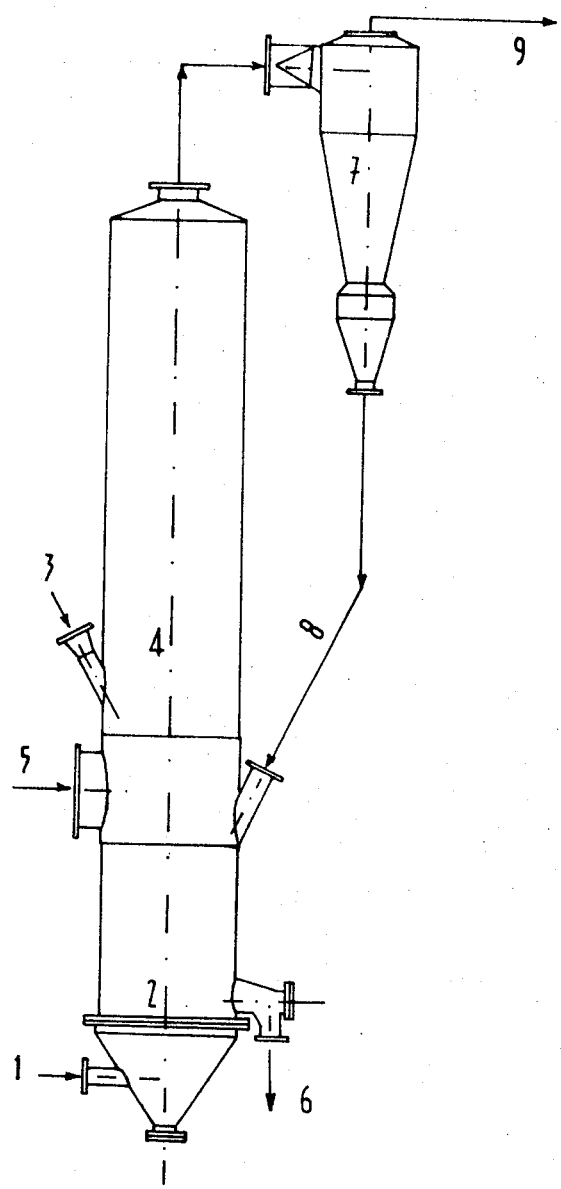

3,754,080
AUTOTHERMIC PROCESS FOR THE PRODUCTION OF ALUMINUM TRIFLUORIDE
Claudio Sperandio, Carlo Boscolo, and Vittorio Jaderosa, Mestre, and Antonio Savino, Milan, Italy, assignors to Montecatini Edison S.p.A., Milan, Italy
Filed Jan. 25, 1971, Ser. No. 109,362
Claims priority, application Italy, Jan. 27, 1970, 19,826/70
Int. Cl. C01f 7/50, 7/02
U.S. Cl. 423—489    3 Claims

ABSTRACT OF THE DISCLOSURE

A continuous autothermic process for the production of high purity aluminum trifluoride is disclosed, wherein partially dehydrated alumina is introduced in a hot state into a pre-heated fluid bed reactor, wherein it is contacted with overheated HF vapors. The feeding temperature of the partially dehydrated alumina is between 140° and 160° C. The partial dehydration of the alumina from the trihydrate to the monohydrate is achieved by a thermal treatment, at 150°–190° C., of a trihydrated alumina in such a way that the quantity of monohydrate as a result of the dehydration shall not exceed 15–20% of the total. The trihydrated alumina to be partially dehydrated has a granulometric distribution that 67–85% of it has dimensions exceeding 325 mesh.

---

The present invention relates to a continuous process for the production of high-titred aluminum fluoride, by means of a reaction carried out in a fluid bed between partially dehydrated alumina and hydrofluoric acid.

It is already known to produce aluminum fluoride of 92–93% purity by reacting, in an apparatus shown schematically in the accompanying figure, a stream of hydrofluoric acid 1 in the vapor state, which is introduced into the reactor through the bottom grate 2 thereof, and a stream of particulate aluminum hydrate 3 dried at 120°–150° C. which descends downwardly from an upper zone of the reactor. The reaction is conducted in a turbulent layer bed 4, maintained under the desired mechanical and thermal conditions by means of a stream of hot gases 5 derived from the combustion of a conventional hydrocarbon fuel, the hot combustion gases being fed to the reactor just above the bottom grate 2. The aluminum fluoride reaction product is discharged from the base 6 of the turbulent layer; the inert hot gases, the aqueous vapor from the chemical reaction and from dehydration as well as excess hydrofluoric acid are all conveyed into a cyclone separator 7 from the bottom of which the solid material 8 is recycled back into the reactor, while from the head of the cyclone fumes 9 flow out from which there is condensed an aqueous solution of hydrofluoric acid.

This process involves a number of disadvantages due to the presence of the flowing hot gases, which disadvantages may be substantially summarized as the dilution of the hydrofluoric acid reactant by inert gases ($CO_2$, $N_2$, $O_2$).

It therefore becomes necessary to repeatedly recycle solid materials in order to ensure the completion of the reaction between the hydrofluoric acid and the alumina, this latter, in fact, meets in the fluid bed a low-concentration hydrofluoric acid, while only near the grate (i.e., near 2) and thus near the point of discharge of the aluminum fluoride reaction product (i.e., near 6) does the concentration of hydrofluoric acid attain the optimum values for a satisfactory course of reaction.

The dilution of the hydrofluoric acid reactant by the inert substances requires, moreover, an apparatus of quite a volume in the washing or recovery zone for the hydrofluoric acid in order to recover the excess unreacted hydrofluoric acid in an aqueous solution (the recovery zone is located after point 9 of the accompanying figure, but for simplicity is not shown on the drawing).

The final consequence of the presence of the stream of hot gases is a reduced capacity of the reactor.

It has now been found, and this constitutes the main object of the present invention, that the process for the production of aluminum trifluoride by the reaction in a fluid bed between hydrofluoric acid and alumina may be conveniently carried out by eliminating the feed of inert gases and by partially dehydrating the alumina before it is introduced into the reactor.

As is quite well known, from tri-hydrated alumina one obtains, at a temperature of from 140°–230° C., AlO·OH (boehmite):

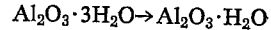
$$Al_2O_3 \cdot 3H_2O \rightarrow Al_2O_3 \cdot H_2O$$

It was the widespread opinion that granules of monohydrated alumina could not react quantitatively with hydrofluoric acid even in excess, and that it was thus impossible to obtain an aluminum trifluoride with a titre or purity higher than 85% therefrom.

In accordance with the present invention, it has now been found that by partially dehydrating the tri-hydrate to monohydrate, one can obtain an aluminum trifluoride titrated at 92–95%.

The process which is the object of this invention consists in pre-heating the reactor (see the accompanying figure) by any desired means (i.e., inert hot gases flowing in at 5; electric resistances, and the like) until a temperature is attained which is in the optimum range for the fluorination reaction of between 520° and 585° C.; in feeding into the reactor through point 3, at a temperature of between 140° and 160° C., an alumina that has been pretreated at 150°–190° C.; in introducing through the bottom of the reactor, through a bottom grate 2, hydrofluoric acid in the vapor state at 80°–100°C., and by simultaneously interrupting the heating of the reactor however this heating had been obtained, in as much as the exothermic fluorination reaction, once it has been primed or initiated, will sustain itself.

According to this invention, the alumina to be fluorinated is a mixture of trihydrated alumina with not more than 15–20% of monohydrated alumina obtained by partially dehydrating at 150°–190° C. a trihydrated alumina. This maximum concentration of boehmite turned out to be the most convenient for the purposes of this invention which substantially consists in letting the fluorination reaction occur under autothermic conditions, thereby eliminating the need for subsequently heating the reactants by means of hot gases.

The advantages afforded by the elimination of the inert hot gases during the carrying out of the reaction thus consist in an increase of the partial pressure of the gaseous hydrofluoric acid, a better distribution of the latter in the turbulent layer of the fluid bed, and a greater reactivity of the turbulent layer towards the alumina fed to the process. Given the consequent absence of the inert substances in the zone for the hydrofluoric acid, it becomes possible to reduce markedly the size of that zone since the elimination of the aqueous solution of the hydrofluoric acid has thereby been facilitated.

It has been found that for the satisfactory operation of the process of this invention, the trihydrated alumina introduced into the thermal dehydration treatment zone must have the following granulometric distribution:

| | Percent |
|---|---|
| Above 325 mesh | 67–85 |
| Below 325 mesh | 15–33 |

If the reaction temperature were to drop, this drop may be compensated for by increasing the drying temperature, that is, by increasing the precentage quality of the monohydrate, while maintaining constant the load expressed as Kg./hr. of alumina fed in.

For a given granulometry and drying temperature, there is observed an increase in the reaction temperature when the load in terms of the alumina is increased.

The following examples are given for purely illustrative purposes:

EXAMPLE 1

The reactor used for the purpose (as shown in the accompanying figure) was of the following size:

| | |
|---|---|
| Base (HF inlet grate) | 1.13 sq. m. |
| Height of turbulent layer | 7.3 m. |
| Height of hot gas inlet (above the grate) | 2 m. |
| Time of residence in the reactor | 20 minutes. |

Into the reactor were then introduced:

| | |
|---|---|
| Hot gases | 350 N cu. m./hr. at 900° C. |
| HF | 970 kg./hr. at 100° C. (Stoichiometric excess= 150 kg./hr.). |
| Alumina (coming from silos) | 1250 kg./hr. |
| Inlet temperature | Room temp. |
| Drying temperature | 120° C. |

Reaction conditions: Temperature: 520° C.

Products Aluminum fluoride: 1250 kg./hr; titration or purity of same, 92%.

Recover: Aqueous HF solution at 25%: 600 kg./hr.

EXAMPLES 2–5

In the following examples the same reactor was used as in Example 1, except that during the reaction there were not introduced into it hot gases.

TABLE

| Example | 2 | 3 | 4 | 5 |
|---|---|---|---|---|
| Al(OH)$_3$, in kg./hr | 2,000 | 2,000 | 1,600 | 1,800 |
| Inflow temperature, °C | 150 | 150 | 150 | 150 |
| Percent greater than 325 mesh | 80 | 80 | 80 | 80 |
| Pre-treatment, °C | 160 | 180 | 180 | 170 |
| Percent of monohydrate | 10 | 14 | 14 | 12 |
| HF: | | | | |
| Temperature, °C | 100 | 100 | 100 | 100 |
| Total, kg./hr | 1,470 | 1,470 | 1,120 | 1,320 |
| Reaction temperature, °C | 540 | 570 | 570 | 570 |
| AlF$_3$: | | | | |
| Kg./hr | 2,000 | 2,000 | 1,600 | 1,800 |
| Titre in percent | 92 | 93.5 | 94.5 | 93.5 |
| Solution recovery, kg./hr. of HF at 25% | 600 | 600 | 400 | 480 |

What is claimed is:

1. A continuous autothermic process for the production of aluminum trifluoride having a purity of 92% to 95% comprising partially dehydrating trihydrated alumina at a temperature of 150° C. to 190° C., to a mixtlure of trihydrated alumina and monohydrated alumina, wherein the amount of monohydrated alumina is comprised between 10% and 20%, introducing said mixture of trihydrated alumina and monohydrated alumina at 140° C. to 160° C. into a fluid bed reactor which has been pre-heated to 520° C. to 585° C. and contacting said mixture of trihydrated alumina and monohydrated alumina with hydrofluoric acid vapors at 80° C. to 100° C.

2. The process of claim 1, wherein the trihydrated alumina to be dehydrated has such a particle size distribution that the 67% to 85% of the particles are less finely divided than 325 mesh and the 33% to 15% of the particles are more finely divided than 325 mesh.

3. The process of claim 1, wherein the amount of monohydrated alumina in the mixture of trihydrated alumina and monohydrated alumina to be fluorinated is comprised between 10% and 15%.

References Cited

UNITED STATES PATENTS

| 2,996,354 | 8/1961 | LaCroix | 23—88 |
| 3,057,680 | 10/1962 | Schytil et al. | 23—88 |
| 3,385,658 | 5/1968 | Broja et al. | 23—88 |
| 3,473,887 | 10/1969 | Chu et al. | 23—88 |

FOREIGN PATENTS

| 656,374 | 8/1951 | Great Britain | 23—88 |
| 1,026,131 | 4/1966 | Great Britain | 23—88 |
| 537,403 | 2/1957 | Canada | 23—88 |
| 274,928 | 4/1964 | Australia | 23—88 |
| 127,247 | 12/1961 | U.S.S.R. | 23—88 |

EDWARD STERN, Primary Examiner

U.S. Cl. X.R.

423—111, 483, 624, 629